May 10, 1949.  C. E. BOWERS  2,469,810
PROTECTING HELMET

Filed Nov. 8, 1945  2 Sheets-Sheet 1

INVENTOR.
CHARLES EVANS BOWERS
BY Joshua R H Potts
HIS ATTORNEY

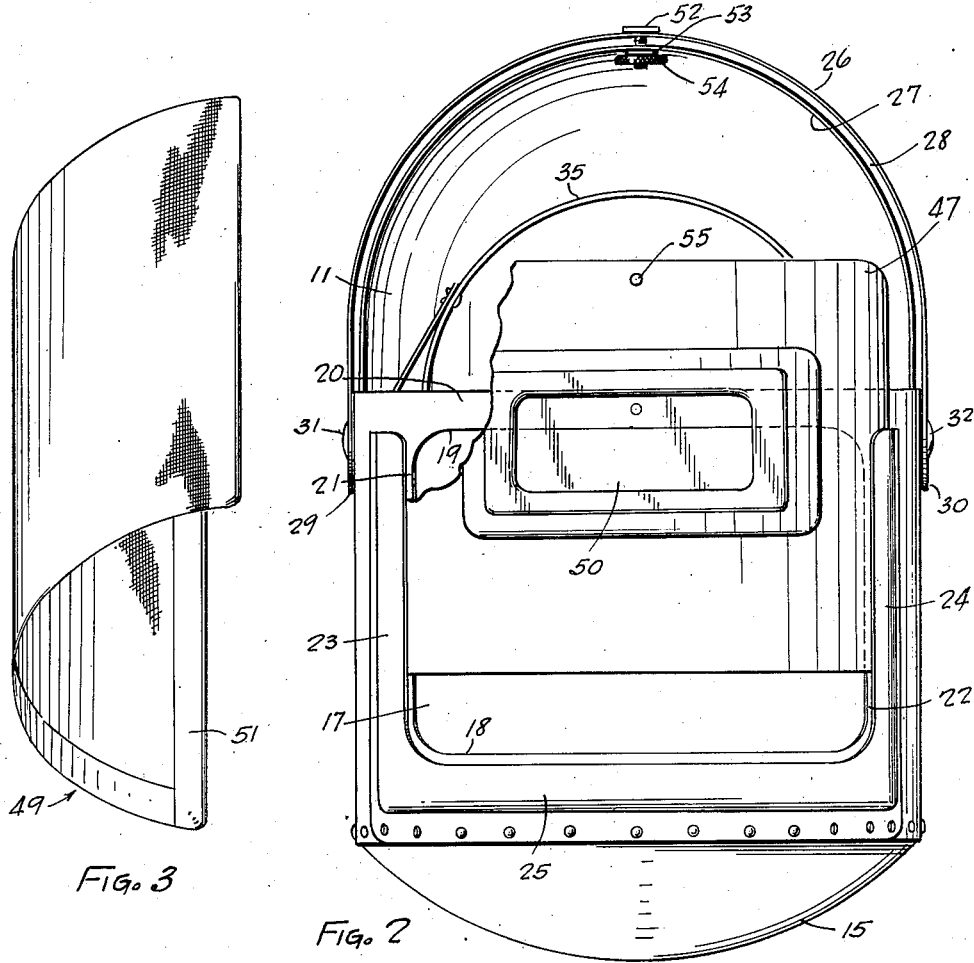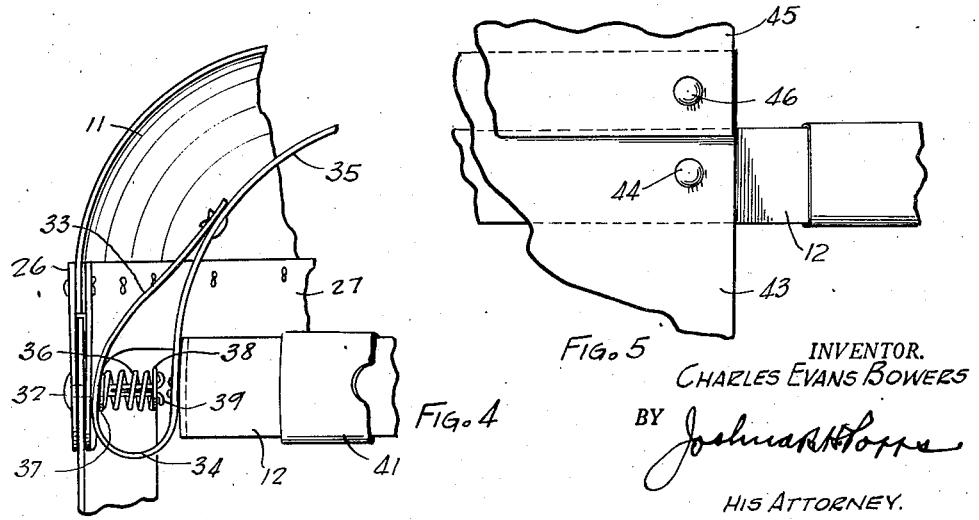

Patented May 10, 1949

2,469,810

UNITED STATES PATENT OFFICE 2,469,810

PROTECTING HELMET

Charles Evans Bowers, Moylan, Pa., assignor to Fibre Metal Products Company, Chester, Pa., a partnership Application November 8, 1945, Serial No. 627,341

5 Claims. (Cl. 2—8)

This invention relates to protecting helmets, such as used in welding to protect the eyes and face from blinding arc lights, sparks, spattering babbitt or other molden metals and acids, and particularly relates to interchangeable devices in combination with helmets of this type wherein the helmet may readily be used for different purposes.

Welding helmets, as used in general practice, are formed with relatively small windows directly in front of the eyes, which, although they protect the eyes and are sufficient for welding, limit the range of vision materially and, therefore, when a welder is preparing or cleaning the surfaces to be welded, he raises the helmet to a position above his head, and even though a small shield may be used, a substantial portion of the face and neck are subjected to flying particles of oxide and scale, particularly from other welders.

Whereas the usual welding helmet is adapted for welding its use is restricted because of the limited vision and it is therefore desirable to extend the use of the helmet by extending the range of vision.

The purpose of this invention is, therefore, to extend the adaptability of welding helmets, and this is accomplished by providing an opening covering a substantial part of the face, and providing a plurality of interchangeable sections adapted to be used for different purposes, providing closures for said opening.

The front of the helmet is therefore formed with a relatively large opening, having grooves at the edges into which the different sections may be inserted as may be desired, and one of the edges of the sections may be held by an overlapping part of the cover of the helmet.

The usual window, such as provided in welding helmets, is incorporated in one of the sections, thereby making it possible to provide the usual welding helmet, another section of transparent material may be provided, which may be used in place of the section having the welding window to increase the range of vision, and another section of wire mesh may also be provided, which is particularly adapted for arresting molten metal, such as babbitt, and also provides protection against sparks and the like.

With these interchangeable sections, the usefulness of the helmet is materially increased and the hazard or danger of injury from flying sparks, molten metal, acids and the like is materially reduced, because when the helmet is used for purposes other than welding, the welding section may be replaced by the transparent sheet or screen and the helmet will be used continuously instead of being raised to the position above the head where the face is exposed to these hazards.

The object of this invention is therefore to increase the usefulness of protecting helmets, such as welding helmets, by making the helmet with interchangeable parts so that it may readily be made adapted for different uses.

Another object of this invention is to provide interchangeable sections adapted to be used in the opening of the front of a helmet in which, when in place, the sections are held by positive means.

The different sections, such as the welding section, the transparent shield and the screen, are of substantially the same size so that they may be slid into the same track, and when in place, they are held by a hinged cover having an overlapping groove into which the upper edges of the sections slide and are positively held.

Another object of this invention is to provide a welding helmet having interchangeable front sections in which the general contour and size of the helmet are substantially the same as all other welding helmets. The relatively large opening, track and hinged cover are incorporated in helmets of this type without increasing the size or changing the shape thereof.

Another object of this invention is to provide a helmet, such as a welding helmet, having a relatively large opening at the front thereof and different types of inserts for providing closures for the said opening in which the inserts are removed and replaced from the top, and the cover, which may be moved upward when removing or replacing the inserts, is secured, in the position of holding the insert, to both the upper edge of the helmet and insert by a common removable member passing therethrough.

A still further object of this invention is to provide a welding helmet with interchangeable sections in the front thereof, which is pivotally mounted on and suspended from headgear whereby it may be raised to an elevated position above the head if desired.

Various other more detailed objects and advantages of the invention, such as arise in connection with carrying out the above noted thoughts in a practical embodiment, will in part become apparent, and in part be hereinafter stated, as the description of the invention proceeds.

The invention, therefore, comprises a helmet of the type used in welding in which an upper part or cover is hinged to the body or lower portion, and provided with an overlapping flange having a continuous groove therein for receiving the upper edge of the lower portion, said lower portion having a relatively large opening in the front with a track around the edges thereof, a plurality of curved sections adapted to provide closures for the said opening, the edges of which are adapted to be inserted in said track, and headgear, upon which said helmet is pivotally mounted.

For a full and more complete understanding of the invention, reference may be had to the following description and accompanying drawings, wherein:

Figure 2 is a view showing a front elevation of the helmet with the cover in the open position and with one of the interchangeable sections partly raised.

Figure 3 is a detail, illustrating one of the sections which is formed of wire screen.

Figure 4 is a detail, showing a section at one side of the helmet, illustrating the pivotal connection between the helmet and headgear.

Figure 5 is a detail, showing a pivotal connection between the body of the helmet, headgear and cover of an alternate type.

Figure 1:
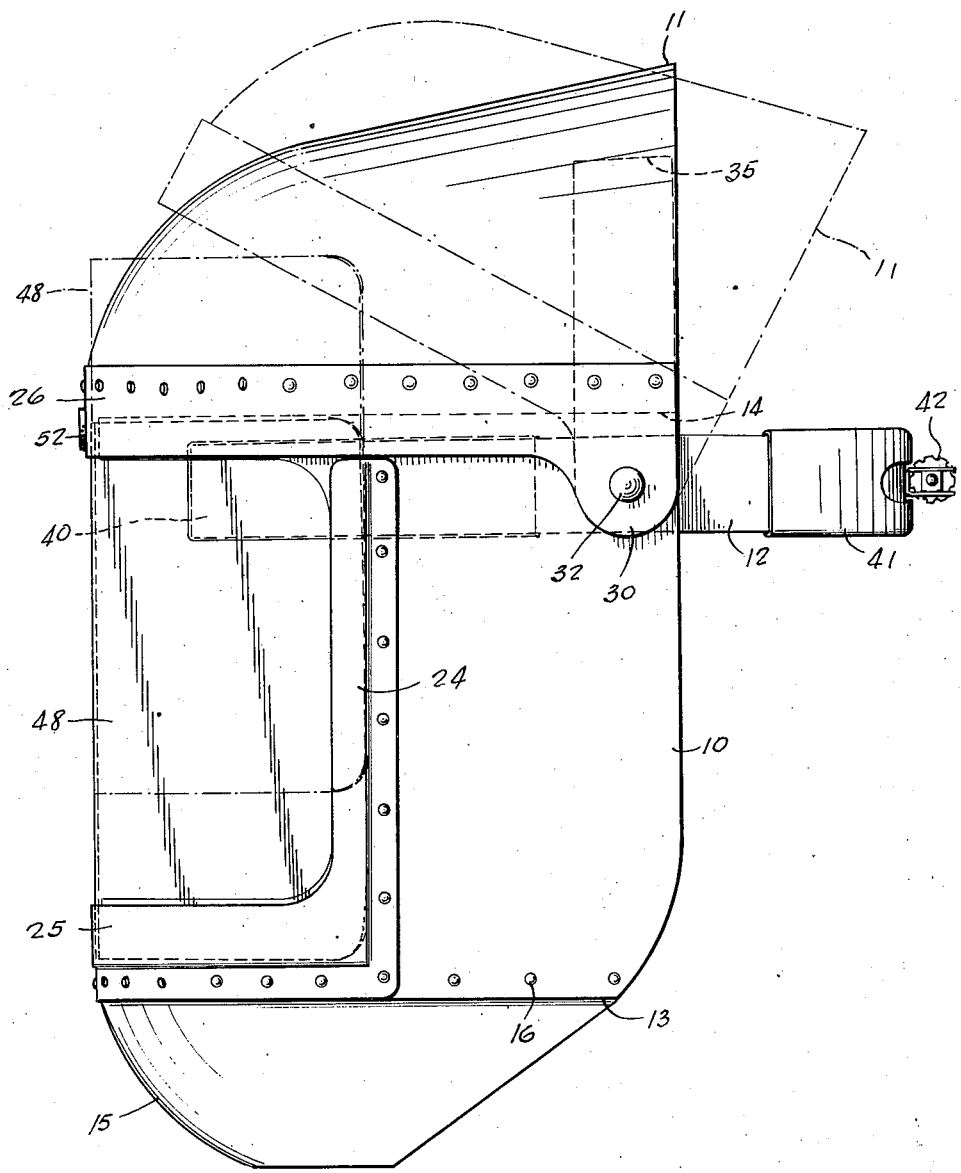
Figure 1 is a view showing the side elevation of the helmet with the cover indicated in dash lines in the open position, and also with dash lines indicating one of the interchangeable sections partly raised.

Referring now to the drawings wherein like reference characters denote corresponding parts, the lower portion or body of the helmet is indicated by the numeral 10, the cover thereof is indicated by the numeral 11, and the headband of the headgear by the numeral 12.

The lower portion 10 of the helmet is formed of a relatively semi-circular sheet of material, extending from a lower point 13 to an upper point 14, and at the lower end is a depending skirt 15, attached to the lower edge of the portion 10 by rivets 16 or any suitable means. In the front of the lower portion 10 is an opening 17, extending from a lower point 18 upward to a point 19, providing a band 20 at the forward upper edge, and this opening extends laterally to points substantially midway of the width of the body 10, as indicated by the lines 21 and 22 in Figure 2. This opening may, however, be of any desired size or shape. The track for holding the edges of the interchangeable sections is formed of a clip-shaped section and extends downward continuously at each side, providing sections 23 and 24, and across the lower end as shown at the point 25.

The cover 11 is made as shown in Figures 1 and 2, the lower edge being formed of two separated bands 26 and 27, providing a groove between the bands, which, when the cover is moved downward to the position shown in Figure 1, receives the upper edge, the band 20 of the lower portion, and also an upper edge of one of the interchangeable sections. The bands 26 and 27 are formed with ears 29 and 30, which extend downward over the lower portion 10 and are pivotally mounted thereon through pins 31 and 32, which extend inward as illustrated in Figure 4. The pins 31 and 32 also extend through the outer sections 33 or loops 34 at the ends of a headband 35 of the headgear 12, which extends upward over the head, and on the inner ends of the pins are springs 36, which provide friction in the pivotal connections by which the helmet may be held in the elevated position above the head. Washers 37 and 38 are provided at the opposite ends of the springs and the washers at the inner end are secured in place by crimping split ends 39 of the pins over as shown in Figure 4.

The band 12 of the headgear is provided with a sweat band 40 at the front and at the rear the ends are split and slidably held in a sleeve 41, the two ends of the band being respectively held by the opposite ends of a turnbuckle 42, providing adjustment in the size of the headband.

In the detail illustrated in Figure 5, the lower portion 43 of the helmet is pivotally mounted by a pin 44 on a headband 12 of headgear, and a cover 45, corresponding to the cover 11, is pivotally mounted on a pin 46 as shown, thereby separating the point where the cover is mounted on the lower portion from the point where the lower portion is mounted on the headgear. It will be understood that the cover may be pivotally mounted on the same pin through which the body portion is mounted on the headgear, as shown in Figures 1 and 4, or may be mounted at a separate point as indicated in Figure 5.

The interchangeable sections adapted to be used in the helmet, and illustrated herein, are indicated by the numerals 47, 48 and 49, the section 47 having a relatively small window 50, such as is used in welding helmets, the section 48 being formed of a transparent material and providing a continuous unobstructed protecting shield, and the section 49 as illustrated in Figure 3 being formed of wire mesh with the edges provided with reenforcing strips 51. It will be understood that other sections, embodying different features and adapted to fit into the same track, may also be used in combination with the helmet to make it adapted for other uses. These interchangeable sections may be slid into the track as illustrated in Figure 2, and when in place, the cover 11 of the helmet is closed to the position shown in Figure 1 with the upper edge of the section and also the upper edge of the band 20, passing upward into the groove 28. The cover, lower portion of the helmet, and interchangeable section may then be secured together by a bolt 52, which may have a washer 53 and a nut 54 on the inner end. The sections 47, 48 and 49 are provided with an opening 55, through which the bolt passes, and the bands 20, 26 and 27 are also provided with registering openings through which the bolt passes.

The construction of the helmet should be readily understood from the foregoing description. Its operation or use should also be obvious, however, the helmet is supplied with the interchangeable sections, and one of the sections may be inserted in the helmet and used, depending upon the use desired. In welding, the section with the usual small window will be used, but if the use subjects the wearer to flying sparks or splattering hot metals, the screen may be substituted, and, if it is desired to use the helmet for cleaning, chipping or dressing welds, the continuous transparent section may be used. In changing from one section to another, it is only necessary to remove a bolt at the upper edge and in the center, and raise the cover. This leaves the upper edge of the section free and it may readily be withdrawn as illustrated in Figure 2. Another section may then be inserted and the cover of the helmet closed.

While a preferred specific embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. A protecting helmet, comprising a face enclosing shield with a relatively large opening in the front thereof, a cover hinged to said shield, headgear upon which said shield and cover are pivotally mounted, and a removable window normally closing the opening in the front of the shield, the upper edge of said window being held by the cover.

2. A protecting helmet, comprising a face enclosing shield with a relatively large opening in the front thereof, a cover hinged to said shield, headgear upon which said shield and cover are pivotally mounted, and a removable window normally closing the opening in the front of the shield, said cover having a slot in the lower edge thereof in which the upper edge of the shield, and also the upper edge of said window is held.

3. A protecting helmet, comprising a shield for substantially enclosing the face of a wearer and having a removable window in the front thereof, a headgear upon which said shield is pivotally mounted, said headgear having a band for extending over the head characterized by loops at the lower ends, the inner sides of which are secured to a head encircling band and the outer sides of which are pivotally attached to the shield, and a head piece pivotally secured on said shield and holding said window in place when closed.

4. A protecting helmet, comprising a shield for substantially enclosing the face of a wearer and having a removable window in the front thereof, a headgear upon which said shield is pivotally mounted, said headgear having a band for extending over the head characterized by loops at the lower ends, the inner sides of which are secured to a head encircling band and the outer sides of which are pivotally attached to the shield, said attaching means comprising pins with springs thereon with the springs held in tension on the pins, and a head piece pivotally mounted on said shield and serving, when closed, to hold said window in place.

5. A protecting helmet, comprising a face shield with an opening therein extending substantially from the upper edge to the lower edge and to points at the sides substantially midway between the front and the rear, a window closing said opening, a cover pivotally mounted on said shield, and headgear upon which said helmet is pivotally mounted, said shield having a track at the sides and lower edge of the opening for holding the edge of the window and said cover having a groove in which the upper edge of the window is held.

CHARLES EVANS BOWERS.

REFERENCES CITED

The following references are of record in the file of this patent:

UNITED STATES PATENTS

| Number | Name | Date |
| --- | --- | --- |
| 1,587,893 | Bowers | June 8, 1926 |
| 2,111,747 | Bowers | Mar. 22, 1938 |
| 2,169,745 | Shipman | Aug. 15, 1939 |
| 2,320,214 | Bowers | May 25, 1943 |